United States Patent
Erickson et al.

(10) Patent No.: US 12,128,612 B2
(45) Date of Patent: Oct. 29, 2024

(54) BINDER AGENT

(71) Applicant: Hewlett-Packard Development Company, L.P., Spring, TX (US)

(72) Inventors: Kristopher J. Erickson, Palo Alto, CA (US); John Samuel Dilip Jangam, Palo Alto, CA (US); Adekunle Olubummo, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/045,783

(22) PCT Filed: Aug. 27, 2018

(86) PCT No.: PCT/US2018/048166
§ 371 (c)(1),
(2) Date: Oct. 7, 2020

(87) PCT Pub. No.: WO2020/046268
PCT Pub. Date: Mar. 5, 2020

(65) Prior Publication Data
US 2021/0154924 A1    May 27, 2021

(51) Int. Cl.
*B22F 1/054* (2022.01)
*B22F 1/10* (2022.01)
(Continued)

(52) U.S. Cl.
CPC ............ *B29C 64/165* (2017.08); *B22F 1/054* (2022.01); *B22F 1/10* (2022.01); *B22F 1/103* (2022.01);
(Continued)

(58) Field of Classification Search
CPC ......... B33Y 10/00; B33Y 70/00; C08L 71/02; B22F 2999/00; C08G 2650/58
See application file for complete search history.

(56) References Cited

U.S. PATENT DOCUMENTS 8,764,894 B2 * 7/2014 Ng ............................ D21C 5/02
106/31.89
9,028,724 B2    5/2015 Son et al.
(Continued)

FOREIGN PATENT DOCUMENTS

| CN | 105057664 | 11/2015 |
| WO | WO-2009017648 | 2/2009 |
| WO | WO-2011031118 A2 | 3/2011 |

OTHER PUBLICATIONS

Vyatskikh et al., Additive manufacturing of 3D nano-architected metals, Nature Communications, 2018, 9:593, 8 pgs.
(Continued)

*Primary Examiner* — Michael P Wieczorek
(74) *Attorney, Agent, or Firm* — Dierker & Kavanaugh, P.C.

(57) ABSTRACT

Examples of binder agents for a three-dimensional (3D) printing process are disclosed. In an example, the binder agent includes copper nanoparticles and a liquid vehicle. In this example, the liquid vehicle includes an antioxidant, polyethylene glycol hexadecyl ether, and a balance of water. Another example of the binder agent includes stainless steel nanoparticles and a liquid vehicle. In this example, the liquid vehicle includes polyethylene glycol hexadecyl ether, and a balance of water. Still another example of the binder agent includes nickel nanoparticles and a liquid vehicle. The liquid vehicle includes an antioxidant; a symmetric triblock copolymer including poly(ethylene oxide) and poly(propylene oxide), and a balance of water.

11 Claims, 2 Drawing Sheets

(51) Int. Cl.

| | | |
|---|---|---|
| *B22F 1/103* | (2022.01) | |
| *B22F 10/14* | (2021.01) | |
| *B22F 10/20* | (2021.01) | |
| *B29C 64/165* | (2017.01) | |
| *B33Y 10/00* | (2015.01) | |
| *B33Y 70/00* | (2020.01) | |
| *C08L 71/02* | (2006.01) | |
| *B22F 12/13* | (2021.01) | |
| *B82Y 30/00* | (2011.01) | |
| *B82Y 40/00* | (2011.01) | |

(52) U.S. Cl.
CPC .............. *B22F 10/14* (2021.01); *B22F 10/20* (2021.01); *B33Y 10/00* (2014.12); *B33Y 70/00* (2014.12); *C08L 71/02* (2013.01); *B22F 12/13* (2021.01); *B22F 2999/00* (2013.01); *B82Y 30/00* (2013.01); *B82Y 40/00* (2013.01); *C08G 2650/58* (2013.01)

(56) References Cited

U.S. PATENT DOCUMENTS

| | | | |
|---|---|---|---|
| 9,606,430 B2* | 3/2017 | Wu | B41J 2/215 |
| 2004/0038009 A1 | 2/2004 | Leyden et al. | |
| 2006/0189113 A1 | 8/2006 | Vanheusden et al. | |
| 2012/0142140 A1 | 6/2012 | Li et al. | |
| 2015/0217367 A1* | 8/2015 | Dickey | B22F 12/55 |
| | | | 164/133 |
| 2016/0297143 A1* | 10/2016 | Ganapathiappan | A01N 43/80 |
| 2017/0251713 A1 | 9/2017 | Warner et al. | |
| 2017/0252804 A1* | 9/2017 | Hanni | B33Y 70/00 |
| 2017/0252977 A1* | 9/2017 | Tsunoya | C04B 35/547 |
| 2018/0236538 A1 | 8/2018 | Gibson et al. | |
| 2018/0236541 A1 | 8/2018 | Holenarasipura Raghu et al. | |

OTHER PUBLICATIONS

Molitch-Hou, M., "XJet Demos Metal Jet 3D Printing Live at Rapid 2016", retrieved at https://www.engineering.com/story/xjet-demos-metal-jet-3d-printing-live-at-rapid-2016, May 24, 2016, pp. 10.

Liu Cheng,Handbook of Surfactant Applications, Aug. 1995,p. 141, Chemical Industry Press.

* cited by examiner

BINDER AGENT

BACKGROUND

In addition to home and office usage, inkjet technology has been expanded to high-speed, commercial and industrial printing. Inkjet printing is a non-impact printing method that utilizes electronic signals to control and direct droplets or a stream of ink to be deposited on media. Some commercial and industrial inkjet printers utilize fixed printheads and a moving substrate web in order to achieve high speed printing. Current inkjet printing technology involves forcing the ink drops through small nozzles by thermal ejection, piezoelectric pressure or oscillation onto the surface of the media. This technology has become a popular way of recording images on various media surfaces (e.g., paper), for a number of reasons, including, low printer noise, capability of high-speed recording and multi-color recording.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1A:
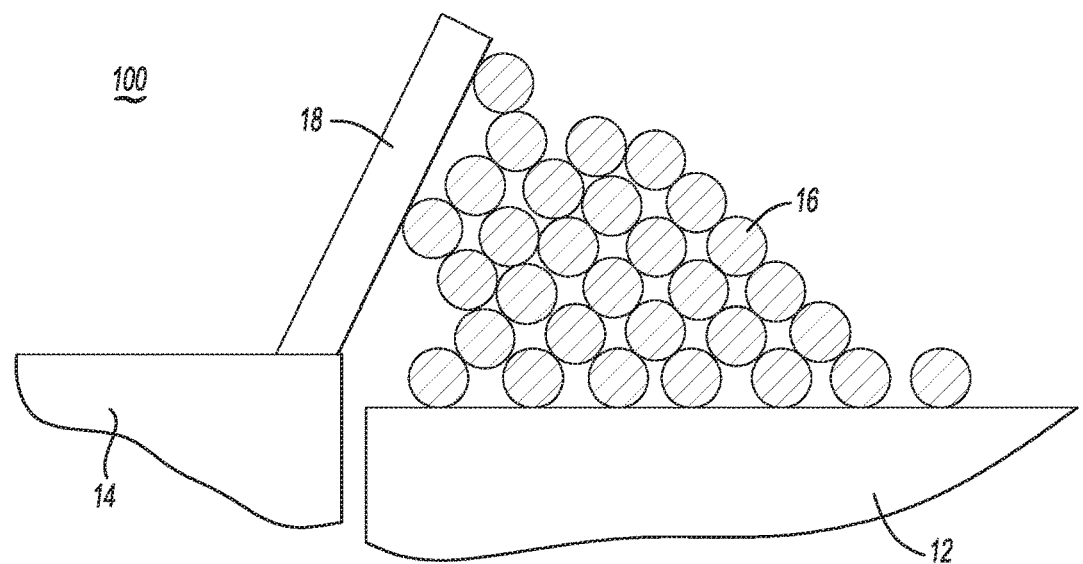
FIGS. 1A through 1C are schematic and partially cross-sectional views depicting the formation of an intermediate part using an example of the binder agent and the 3D printing method disclosed herein.

Disclosed herein are binder agents for a three-dimensional (3D) printing process. In some examples, the binder agent includes copper nanoparticles. In some other examples, the binder agent includes stainless steel nanoparticles. In still some other examples, the binder agent includes nickel nanoparticles.

The binder agents disclosed herein may be used in examples of the 3D printing processes disclosed herein. In some examples, the 3D printing process may include iteratively patterning uniformly spread layers of metal build material particles with the binder agent, and iteratively heating the layers to a temperature that will sinter or melt the metal nanoparticles without sintering or melting the metal build material particles. The sintered or melted metal nanoparticles form metal connections that bind the metal build material particles together. These processes produce an intermediate part which can be extracted from the powder bed (or other build surface). The extracted intermediate part may be subjected to post-printing processing (e.g., heating via sintering), leading to consolidation of the metal build material particles into a mechanically stronger final metal object.

Throughout this disclosure, a weight percentage that is referred to as "wt % active" refers to the loading of an active component of a dispersion or other formulation that is present in the binder fluid. For example, nanoparticles may be present in a water-based formulation (e.g., a stock solution or dispersion) before being incorporated into the binder fluid. In this example, the wt % actives of the nanoparticles accounts for the loading (as a weight percent) of the nanoparticle solids that are present in the binder fluid, and does not account for the weight of the other components (e.g., water, etc.) that are present in the stock solution or dispersion with the nanoparticle solids. The term "wt %," without the term actives, refers to either i) the loading (in the binder fluid) of a 100% active component that does not include other non-active components therein, or ii) the loading (in the binder fluid) of a material or component that is used "as is" and thus the wt % accounts for both active and non-active components.

Binder Agents Including Copper Nanoparticles

In some examples, the binder agent for a three-dimensional (3D) printing process, comprises: copper nanoparticles; and a liquid vehicle including: an antioxidant; polyethylene glycol hexadecyl ether; and a balance of water. In some of these examples, the binder agent consists of the copper nanoparticles and the liquid vehicle with no other components. In some other of these examples, the binder agent may include additional components.

Some examples of the binder agent include the copper nanoparticles. In one of these examples, the binder agent may be used in a 3D printing process with build material particles of iron, an iron alloy, nickel, a nickel alloy, aluminum, an aluminum alloy, titanium, a titanium alloy, copper, a copper alloy, silver, a silver alloy, gold, a gold alloy, platinum, a platinum alloy, palladium, or a palladium alloy.

The copper nanoparticles may have a particle size that allows them to sinter or melt at a temperature less than 400° C. In some examples, the copper nanoparticles may have a particle size that allows them to sinter or melt at a temperature less than 250° C. The particle size of the copper nanoparticles may also minimize the settling of the copper nanoparticles in the vehicle of the binder agent.

In some examples, the copper nanoparticles have a particle size ranging from about 1 nm to about 100 nm. In one example, the copper nanoparticles have a particle size of less than 100 nm. In another example, the copper nanoparticles have a particle size of less than 50 nm. In still another example, the copper nanoparticles have a particle size of less than 30 nm. In yet another example, the copper nanoparticles have a particle size ranging from about 4 nm to about 15 nm. The term "particle size", as used herein, may refer to a number-weighted mean diameter or a volume-weighted mean diameter of a particle distribution.

The copper nanoparticles may be present in the binder agent in an amount that allows the binder agent to have binding efficiency. The copper nanoparticles may also be present in the binder agent in an amount that allows the binder agent to be jettable via thermal or piezoelectric printing. In some examples, the copper nanoparticles are present in the binder agent in an amount ranging from about 2 wt % active to about 60 wt % active, based on a total weight of the binder agent. In one example, the copper nanoparticles are present in the binder agent in an amount ranging from about 8 wt % active to about 30 wt % active, based on a total weight of the binder agent. In another example, the copper nanoparticles are present in the binder agent in an amount greater than 10 wt % active, based on the total weight of the binder agent. In still another example, the copper nanoparticles are present in the binder agent in an amount of about 20 wt % active, based on the total weight of the binder agent. In yet another example, the copper nanoparticles are present in the binder agent in an amount of about 22 wt % active, based on the total weight of the binder agent.

The binder agent also includes the liquid vehicle. As used herein, "liquid vehicle" may refer to the liquid in which the metal nanoparticles (in this example, the copper nanoparticles) are dispersed to form the binder agent. A wide variety of liquid vehicles may be used in the binder agent.

When the binder agent includes the copper nanoparticles, the liquid vehicle includes an antioxidant, polyethylene glycol hexadecyl ether, and a balance of water. In some of these examples, the liquid vehicle consists of the antioxidant, polyethylene glycol hexadecyl ether, and water with no other components. In some other of these examples, the liquid vehicle may include additional components, such as co-solvent(s), surfactant(s), anti-kogation agent(s), antimicrobial agent(s), and/or chelating agent(s).

The binder agent may include the antioxidant to prevent the oxidation of the copper nanoparticles. If the copper nanoparticles are oxidized, they may be unable to sinter or melt at a temperature less than 400° C.

It is believed that any antioxidant may be used. Some examples of the antioxidant include ascorbic acid, hydrazine, sodium borohydride, formic acid, oxalic acid, glycolic acid, maleic acid, malonic acid, aniline, sulfonamide, etc. Other examples of the antioxidant include dithionate ($Na_2S_2O_6$) and thiosulfates ($Na_2S_2O_3$). Still other examples of the antioxidant include reducing sugars (such as monosaccharides like glucose, fructose, galactose, etc.) due to their free aldehyde groups. Yet other examples of the antioxidant include phosphites ($P(OR)_3$) and TINUVIN® additives (ultraviolet light absorbers and hindered-amine light stabilizers, available from Ciba-Geigy Corp.). In some other examples, the antioxidant may include IRGANOX® 1098 (benzenepropanamide, N,N'-1,6-hexanediylbis(3,5-bis(1,1-dimethylethyl)-4-hydroxy)), IRGANOX® 254 (a mixture of 40% triethylene glycol bis(3-tert-butyl-4-hydroxy-5-methylphenyl), polyvinyl alcohol and deionized water), and/or other sterically hindered phenols. In still other examples, the antioxidant may include a phosphite and/or an organic sulfide (e.g., a thioester).

In some examples, the antioxidant may be present in the binder agent in an amount ranging from about 0.05 wt % active to about 40 wt % active, based on the total weight of the binder agent. In other examples, the antioxidant may be present in the binder agent in an amount ranging from about 2 wt % active to about 20 wt % active, based on the total weight of the binder agent. In still other examples, the antioxidant is present in the binder in an amount of about 0.2 wt % active, based on the total weight of the binder fluid. The amount of the antioxidant present in the binder agent may depend, in part, on the antioxidant used and/or the interaction between the antioxidant and the other components of the binder agent. For example, when the antioxidant is hydrazine, a smaller amount of the antioxidant may be used (e.g., about 0.5 wt % active based on the total weight of the binder agent). As another example, when the binder agent includes co-solvent(s) that act as reducing agent(s), a larger amount of the antioxidant may be used (e.g., about 40 wt % active based on the total weight of the binder agent).

It is to be understood that the antioxidant may be added to this example of the binder agent separately or as part of a copper nanoparticle dispersion.

The binder agent may include polyethylene glycol hexadecyl ether to reduce and/or prevent the settling of the copper nanoparticles. If the copper nanoparticles settle, the binder agent may become non-jettable.

In some instances, when the copper nanoparticles settle, they may settle as a hard flocculant. In these instances, the settled copper nanoparticles may be non-redispersible. In addition to reducing and/or preventing the settling of the copper nanoparticles, the polyethylene glycol hexadecyl ether may reduce and/or prevent the formation of non-redispersible deposit(s) if/when the copper nanoparticles settle. As such, the polyethylene glycol hexadecyl ether may improve the redispersibility of settled copper nanoparticles.

In some examples, the polyethylene glycol hexadecyl ether may be BRIJ® C2 (formerly BRIJ® 52) (available from Croda, Inc.).

In some examples, the polyethylene glycol hexadecyl ether may evaporate or thermally decompose at a temperature below the sintering temperature of the copper nanoparticles (e.g., a temperature below 400° C. or a temperature below 250° C.). In one of these examples, the polyethylene glycol hexadecyl ether may evaporate or thermally decompose at a temperature below 250° C. In another one of these examples, the polyethylene glycol hexadecyl ether may evaporate or thermally decompose at a temperature below 175° C. If the polyethylene glycol hexadecyl ether does not evaporate or thermally decompose at a temperature below the sintering temperature of the copper nanoparticles, the copper nanoparticles may be unable to sinter at the sintering temperature due to the presence of the polyethylene glycol hexadecyl ether around the copper nanoparticles.

In some examples, polyethylene glycol hexadecyl ether may be present in the binder agent in an amount ranging from about 0.1 wt % to about 10 wt %, based on the total weight of the binder agent. In some other examples, polyethylene glycol hexadecyl ether may be present in the binder agent in an amount ranging from about 5 wt % to about 35 wt %, based on the weight of the copper nanoparticles in the binder agent. In one of these examples, polyethylene glycol hexadecyl ether is present in the binder agent in an amount of about 11.3 wt %, based on the weight of the copper nanoparticles.

The liquid vehicle may also include co-solvent(s). Classes of organic co-solvents that may be used in the liquid vehicle include aliphatic alcohols, aromatic alcohols, diols, glycol ethers, polyglycol ethers, 2-pyrrolidones, caprolactams, formamides, acetamides, glycols, and long chain alcohols. Examples of these co-solvents include primary aliphatic alcohols, secondary aliphatic alcohols, 1,2-alcohols, 1,3-alcohols, 1,5-alcohols, 1,6-hexanediol or other diols (e.g., 1,5-pentanediol, 2-methyl-1,3-propanediol, etc.), ethylene glycol alkyl ethers, propylene glycol alkyl ethers, higher homologs ($C_6$-$C_{12}$) of polyethylene glycol alkyl ethers, triethylene glycol, tetraethylene glycol, tripropylene glycol methyl ether, N-alkyl caprolactams, unsubstituted caprolactams, both substituted and unsubstituted formamides, both substituted and unsubstituted acetamides, and the like. Other examples of organic co-solvents include dimethyl sulfoxide (DMSO), isopropyl alcohol, isobutanol, ethanol, pentanol, acetone, or the like.

Other examples of suitable co-solvents include water-soluble high-boiling point solvents, which have a boiling point within the range of from 120° C. to 250° C. Some examples of high-boiling point solvents include 2-pyrrolidone (i.e., 2-pyrrolidinone, boiling point of about 245° C.), 1-methyl-2-pyrrolidone (boiling point of about 203° C.), N-(2-hydroxyethyl)-2-pyrrolidone (boiling point of about 140° C.), 2-methyl-1,3-propanediol (boiling point of about 212° C.), and combinations thereof. In some examples, water-soluble high-boiling point solvents, which have a boiling point within the range of from 120° C. to 175° C. may be used. Some examples of these co-solvents include hexanol (boiling point of about 157° C.), ethylene glycol (boiling point of about 197° C.), propylene glycol (boiling point of about 188° C.), pentanol (boiling point of about 138° C.), and combinations thereof.

In some examples, the co-solvent(s) may be present in the binder agent in an amount ranging from about 5 wt % to about 50 wt %, based on the total weight of the binder agent. In one of these examples, the co-solvent is present in the binder agent in an amount of about 20 wt %, based on the total weight of the binder agent.

In some examples, the liquid vehicle is devoid of any co-solvent(s) having a boiling point greater than 250° C. As such, in some examples, the binder agent may be devoid of any co-solvent(s) having a boiling point greater than 250° C. If the liquid vehicle or the binder agent includes a co-solvent(s) that has a boiling point greater than 250° C., these co-solvents may be difficult to remove during a 3D printing process.

In other examples, the liquid vehicle is devoid of any co-solvent(s) having a boiling point greater than 175° C. As such, in some examples, the binder agent may be devoid of any co-solvent(s) having a boiling point greater than 175° C.

As used herein, the term "devoid of" when referring to a component (such as, e.g., a co-solvent having a boiling point greater than 250° C., or a co-solvent having a boiling point greater than 175° C., etc.) may refer to a composition that does not include any added amount of the component, but may contain residual amounts, such as in the form of impurities. The components may be present in trace amounts, and in one aspect, in an amount of less than 0.1 weight percent (wt % or wt % active) based on the total weight of the composition (e.g., binder agent), even though the composition is described as being "devoid of" the component. In other words, "devoid of" of a component may mean that the component is not specifically included, but may be present in trace amounts or as an impurity inherently present in certain ingredients.

In some examples, surfactant(s) may be used in the liquid vehicle to improve the jettability of the binder agent. Examples of suitable surfactants include non-ionic surfactants. Some specific examples include a self-emulsifiable, non-ionic wetting agent based on acetylenic diol chemistry (e.g., SURFYNOL® SEF from Evonik Industries), a non-ionic fluorosurfactant (e.g., CAPSTONE® fluorosurfactants, such as CAPSTONE® FS-35, from Chemours), and combinations thereof. In other examples, the surfactant is an ethoxylated low-foam wetting agent (e.g., SURFYNOL® 440 or SURFYNOL® CT-111 from Evonik Industries) or an ethoxylated wetting agent and molecular defoamer (e.g., SURFYNOL® 420 from Evonik Industries). Still other suitable surfactants include non-ionic wetting agents and molecular defoamers (e.g., SURFYNOL® 104E from Evonik Industries) or water-soluble, non-ionic surfactants (e.g., TERGITOL™ TMN-6, TERGITOL™ 15-S-7, or TERGITOL™ 15-S-9 (a secondary alcohol ethoxylate) from The Dow Chemical Company or TEGO® Wet 510 (polyether siloxane) available from Evonik Industries).

Whether a single surfactant is used or a combination of surfactants is used, the total amount of surfactant(s) in the binder agent may range from about 0.1 wt % active to about 10 wt % active based on the total weight of the binder agent. In an example, the total amount of surfactant(s) in the binder agent may be about 3 wt % active, based on the total weight of the binder agent.

An anti-kogation agent may be included in the binder agent that is to be jetted using thermal inkjet printing. Kogation refers to the deposit of dried printing liquid (e.g., binder agent) on a heating element of a thermal inkjet printhead. Anti-kogation agent(s) is/are included to assist in preventing the buildup of kogation. Examples of suitable anti-kogation agents include oleth-3-phosphate (e.g., commercially available as CRODAFOS™ O3A or CRODAFOS™ N-3 acid from Croda), or a combination of oleth-3-phosphate and a low molecular weight (e.g., <5,000) polyacrylic acid polymer (e.g., commercially available as CARBOSPERSE™ K-7028 Polyacrylate from Lubrizol).

Whether a single anti-kogation agent is used or a combination of anti-kogation agents is used, the total amount of anti-kogation agent(s) in the binder agent may range from greater than 0.20 wt % active to about 0.5 wt % active based on the total weight of the binder agent. In an example, the oleth-3-phosphate is included in an amount ranging from about 0.20 wt % active to about 0.60 wt % active, and the low molecular weight polyacrylic acid polymer is included in an amount ranging from about 0.005 wt % active to about 0.03 wt % active.

The liquid vehicle may also include antimicrobial agent(s). Suitable antimicrobial agents include biocides and fungicides. Example antimicrobial agents may include the NUOSEPT™ (Troy Corp.), UCARCIDE™ (Dow Chemical Co.), ACTICIDE® B20 (Thor Chemicals), ACTICIDE® M20 (Thor Chemicals), ACTICIDE® MBL (blends of 2-methyl-4-isothiazolin-3-one (MIT), 1,2-benzisothiazolin-3-one (BIT) and Bronopol) (Thor Chemicals), AXIDE™ (Planet Chemical), NIPACIDE™ (Clariant), blends of 5-chloro-2-methyl-4-isothiazolin-3-one (CIT or CMIT) and MIT under the tradename KATHON™ (Dow Chemical Co.), and combinations thereof. Examples of suitable biocides include an aqueous solution of 1,2-benzisothiazolin-3-one (e.g., PROXEL® GXL from Arch Chemicals, Inc.), quaternary ammonium compounds (e.g., BARDAC® 2250 and 2280, BARQUAT® 50-65B, and CARBOQUAT® 250-T, all from Lonza Ltd. Corp.), and an aqueous solution of methylisothiazolone (e.g., KORDEK® MLX from Dow Chemical Co.).

In an example, the binder agent may include a total amount of antimicrobial agent(s) that ranges from about 0.001 wt % active to about 1 wt % active, based on the total weight of the binder agent. In an example, the antimicrobial agent(s) is/are a biocide(s) and is/are present in the binder agent in an amount of about 0.14 wt % active or about 0.18 wt % active, based on the total weight of the binder agent.

Chelating agents (or sequestering agents) may be included in the liquid vehicle to eliminate the deleterious effects of heavy metal impurities. Examples of chelating agents include disodium ethylenediaminetetraacetic acid (EDTA-Na), ethylene diamine tetra acetic acid (EDTA), and methylglycinediacetic acid (e.g., TRILON® M from BASF Corp.).

Whether a single chelating agent is used or a combination of chelating agents is used, the total amount of chelating agent(s) in the binder agent may range from greater than 0 wt % active to about 2 wt % active, based on the total weight of the binder agent. In an example, the chelating agent(s) is/are present in the binder agent in an amount of about 0.04 wt % active, based on the total weight of the binder agent.

Water may make up the balance of the liquid vehicle. As such, the amount of water may vary depending upon the amounts of the other components that are included. As an example, deionized water may be used.

In some examples, the binder agent may be a jettable composition. In one of these examples, the binder agent may be jettable via a thermal inkjet printhead. In any of the examples in which the binder agent is a jettable composition, the components of the liquid vehicle may be selected to enable reliable jetting. For example, when the binder agent is to be thermal inkjet jettable, the binder agent may include at least 30 wt % water, based on the total weight of the binder agent.

Methods of Making the Binder Agent Including Copper Nanoparticles

Also disclosed herein is a method of making the binder agent that includes the copper nanoparticles. In an example, the method comprises: milling a combination of a slurry, grinding media, the polyethylene glycol hexadecyl ether, and vehicle components to form a mixture, the slurry including the copper nanoparticles, the antioxidant, and water; and filtering the mixture to remove the grinding media and form the binder agent.

The copper nanoparticles, the antioxidant, and the polyethylene glycol hexadecyl ether may each be as described above. In an example, the slurry may include the copper nanoparticles in an amount of about 53 wt % active, the antioxidant in an amount of about 0.5 wt % active, and a balance of water, based on the total weight of the slurry. The grinding media may be zirconia beads having a diameter of about 200 µm, although other grinding media may be used. The vehicle components may include any of the components of the liquid vehicle described above.

In an example, the combination may include about 5 grams of the slurry, about 60 grams of the grinding media, about 0.3 grams of polyethylene glycol hexadecyl ether, and about 3 mL of the vehicle components.

In some examples, the milling may be accomplished in a planetary ball mill. In one of these examples, the combination of the slurry, grinding media, polyethylene glycol hexadecyl ether, and vehicle components may be placed into zirconia milling vessel(s), which may then be placed in the planetary ball mill and rotated. In an example, two zirconia milling vessels are used.

Milling conditions may depend, in part, on the size of the grinding media, the rotation speed of the milling machine, and the initial homogenization of the combination. In some examples, suitable milling conditions may include from 4 to 6 milling events, where each event takes place for about 6 minutes at about 700 rpm, with about 30 minutes of rest between the milling events. In one of these examples, the milling includes 4 milling events. These milling conditions may be used when milling is accomplished in a non-cooled milling machine (e.g., a non-cooled planetary mill). In these examples, the resting periods may allow the combination/mixture to cool so that the water and/or co-solvent(s) therein do not evaporate. In other examples when milling is accomplished in a non-cooled milling machine (e.g., a non-cooled planetary mill), the milling conditions may include milling for a time period ranging from about 10 minutes to about 40 minutes with suitable resting periods so the water and/or co-solvent(s) in the combination/mixture do not evaporate. In still other examples, milling may be accomplished in a cooled milling machine (e.g., a cooled planetary mill). In these examples, milling may be accomplished continuously without any resting periods. In one of these examples, the milling conditions may include continuous milling for a time period ranging from about 10 minutes to about 40 minutes at about 700 rpm. It is to be understood that the milling conditions described herein are examples and that other milling conditions may be used.

Filtering may be accomplished in order to remove the grinding media. In some examples, the collected filtrate is the binder fluid, which is jettable via a thermal inkjet printhead. In other examples, the collected filtrate may be further diluted in order to obtain the binder fluid. Whether dilution is used depends, in part, on the filtering mechanism used, the filtrate that is collected, the concentration of the components in the filtrate, etc.

In some examples, the filtering may be accomplished with a stainless steel filter. As such, the mixture formed from the milling may be placed onto the stainless steel filter from the zirconia milling vessel(s). In some of these examples, the mixture alone is filtered to remove the grinding medium, and the collected filtrate is used as the binder agent without rinsing or dilution. In others of these examples, a blend of vehicle components and water may be used to rinse the mixture through the filter. In an example, the vehicle components included in the blend may be similar to the vehicle components included in the milling combination, and the water may be deionized water. In another example, the blend may include the vehicle components and water at a volume ratio of vehicle components to water ranging from 1:0.2 to 1:5. In yet another example, the blend may include the vehicle components and water at a volume ratio of vehicle components to water of 1:2. In still another example, about 50 mL of the blend may be used to rinse the mixture through the filter. In these examples, the binder agent is formed after the grinding media is removed and the filtrate is rinsed and diluted with the blend.

In other examples, the filtering may be accomplished with a filter built into the milling machine. In some of these examples, the mixture is transported through the built-in filter, which separates the grinding medium and forms the binder agent without additional rinsing or dilution. In others of these examples, the mixture is transported through the built-in filter, which separates the grinding medium. The filtered mixture (filtrate) may then be further diluted with the blend describe herein to form the binder fluid.

Binder Agents Including Stainless Steel Nanoparticles

In some examples, the binder agent for a three-dimensional (3D) printing process, comprises: stainless steel nanoparticles; and a liquid vehicle including: polyethylene glycol hexadecyl ether; and a balance of water. In some of these examples, the binder agent consists of the stainless steel nanoparticles and the liquid vehicle with no other components. In some other of these examples, the binder agent may include additional components.

Some examples of the binder agent include the stainless steel nanoparticles. In one of these examples, the binder agent may be used in a 3D printing process with iron build material particles, iron alloy build material particles (e.g., steel build material particles), nickel build material particles, or nickel alloy build material particles.

The stainless steel nanoparticles may be nanoparticles of any stainless steel. In an example, the stainless steel nanoparticles may be nanoparticles of SS (Stainless Steel) GP1, SS 17-4PH, SS316, SS 316L, SS 430L, or a combination thereof. In another example, the stainless steel nanoparticles may be nanoparticles of SS 316L.

The stainless steel nanoparticles may have a particle size that allows them to sinter or melt at a temperature less than 400° C. In some examples, the stainless steel nanoparticles may have a particle size that allows them to sinter or melt at a temperature less than 250° C. The particle size of the stainless steel nanoparticles may also minimize the settling of the stainless steel nanoparticles.

In some examples, the stainless steel nanoparticles have a particle size ranging from about 1 nm to about 100 nm. In one example, the stainless steel nanoparticles have a particle size ranging from about 40 nm to about 60 nm. In another example, the stainless steel nanoparticles have a particle size of less than 50 nm. In still another example, the stainless steel nanoparticles have a particle size of less than 30 nm. In yet another example, the stainless steel nanoparticles have a particle size ranging from about 4 nm to about 15 nm. As mentioned above, the term "particle size", as used herein, may refer to a number-weighted mean diameter or a volume-weighted mean diameter of a particle distribution.

The stainless steel nanoparticles may be present in the binder agent in an amount that allows the binder agent to have binding efficiency. The stainless steel nanoparticles may also be present in the binder agent in an amount that allows the binder agent to be jettable via thermal or piezoelectric inkjet printing. In some examples, the stainless steel nanoparticles are present in the binder agent in an amount ranging from about 2 wt % active to about 60 wt % active, based on a total weight of the binder agent. In one example, the stainless steel nanoparticles are present in the binder agent in an amount ranging from about 8 wt % active to about 30 wt % active, based on a total weight of the binder agent. In another example, the stainless steel nanoparticles are present in the binder agent in an amount greater than 10 wt % active, based on the total weight of the binder agent. In still another example, the stainless steel nanoparticles are present in the binder agent in an amount of about 12 wt % active, based on the total weight of the binder agent.

As mentioned above, the binder agent also includes the liquid vehicle, which, in this example, has the stainless steel nanoparticles dispersed therein.

When the binder agent includes the stainless steel nanoparticles, the liquid vehicle includes polyethylene glycol hexadecyl ether and a balance of water. In some of these examples, the liquid vehicle consists of polyethylene glycol hexadecyl ether and water. In some other of these examples, the liquid vehicle may include additional components, such as co-solvent(s), surfactant(s), anti-kogation agent(s), antimicrobial agent(s), and/or chelating agent(s).

The binder agent may include polyethylene glycol hexadecyl ether to reduce or prevent the settling of the stainless steel nanoparticles. If the stainless steel nanoparticles settle, the binder agent may become non-jettable.

In some instances, when the stainless steel nanoparticles settle, they may settle as a hard flocculant. In these instances, the settled stainless steel nanoparticles may be non-redispersible. In addition to reducing and/or preventing the settling of the stainless steel nanoparticles, the polyethylene glycol hexadecyl ether may reduce and/or prevent the formation of non-redispersible deposit(s) if/when the stainless steel nanoparticles settle. As such, the polyethylene glycol hexadecyl ether may improve the redispersibility of settled stainless steel nanoparticles.

As mentioned above, the polyethylene glycol hexadecyl ether may be BRIJ® C2 (formerly BRIJ® 52, available from Croda, Inc.).

In some examples, the polyethylene glycol hexadecyl ether may evaporate or thermally decompose at a temperature below the sintering temperature of the stainless steel nanoparticles (e.g., a temperature below 400° C. or a temperature below 250° C.). If the polyethylene glycol hexadecyl ether does not evaporate or thermally decompose at a temperature below the sintering temperature of the stainless steel nanoparticles, the stainless steel nanoparticles may be unable to sinter at the sintering temperature due to the presence of the polyethylene glycol hexadecyl ether around the stainless steel nanoparticles.

In some examples, polyethylene glycol hexadecyl ether may be present in the binder agent in an amount ranging from about 0.1 wt % to about 10 wt %, based on the total weight of the binder agent. In some other examples, polyethylene glycol hexadecyl ether may be present in the binder agent in an amount ranging from about 5 wt % to about 35 wt %, based on the weight of the stainless steel nanoparticles. In one of these examples, polyethylene glycol hexadecyl ether is present in the binder agent in an amount of about 15 wt %, based on the weight of the stainless steel nanoparticles.

In some examples, the binder agent including the stainless steel nanoparticles is devoid of an antioxidant. In other examples, the binder agent including the stainless steel nanoparticles is devoid of any co-solvent(s) having a boiling point greater than 250° C. In still other examples, the binder agent including the stainless steel nanoparticles is devoid of any co-solvent(s) having a boiling point greater than 175° C.

In some examples, the binder agent includes co-solvent(s), surfactant(s), anti-kogation agent(s), antimicrobial agent(s), chelating agent(s), or a combination thereof. Any of co-solvents, surfactants, anti-kogation agents, antimicrobial agents, or chelating agents described above in reference to the copper nanoparticle containing binder fluid may be used in the any of the amounts describe above. As such, when the binder agent includes the stainless steel nanoparticles, the liquid vehicle may be similar to the liquid vehicle when the binder agent includes the copper nanoparticles.

Water may make up the balance of the liquid vehicle, and as such, the amount of water may vary depending upon the amounts of the other components that are included. As an example, deionized water may be used.

In some examples, the binder agent including the stainless steel nanoparticles may be a jettable composition. In one of these examples, the binder agent may be jettable via a thermal inkjet printhead.

Methods of Making the Binder Agent Including Stainless Steel Nanoparticles

Also disclosed herein is a method of making the binder agent that includes stainless steel nanoparticles. In an example, the method comprises: milling a combination of the stainless steel nanoparticles, grinding media, the polyethylene glycol hexadecyl ether, and vehicle components to form a mixture, the vehicle components including water; and filtering the mixture to remove the grinding media and form the binder agent.

The stainless steel nanoparticles and the polyethylene glycol hexadecyl ether may each be as described above. Furthermore, the vehicle components may include any of the components of the liquid vehicle described above. In an example, the combination may include about 2 grams of the stainless steel nanoparticles, about 60 grams of the grinding media, about 0.3 grams of polyethylene glycol hexadecyl ether, and about 5 mL of the vehicle components.

In some examples, the milling may be accomplished in a planetary ball mill. In these examples, the grinding media may be zirconia beads having a diameter of about 200 µm, although other grinding media may be used. In one of these examples, the combination of the stainless steel nanoparticles, grinding media, polyethylene glycol hexadecyl ether, and vehicle components may be placed into zirconia milling vessel(s), which may then be placed in the planetary ball mill and rotated. In an example, two zirconia milling vessels are used.

Milling conditions may depend, in part, on the size of the grinding media, the rotation speed of the milling machine, and the initial homogenization of the combination. In some examples, suitable milling conditions may include from 4 to 6 milling events, where each event takes place for about 6 minutes at about 700 rpm, with about 30 minutes of rest between the milling events. In one of these examples, the milling includes 6 milling events. These milling conditions may be used when milling is accomplished in a non-cooled milling machine (e.g., a non-cooled planetary mill). In these examples, the resting periods may allow the combination/mixture to cool so that the water and/or co-solvent(s) therein do not evaporate. In other examples when milling is accomplished in a non-cooled milling machine (e.g., a non-cooled planetary mill), the milling conditions may include milling for a time period ranging from about 10 minutes to about 40 minutes with suitable resting periods so the water and/or co-solvent(s) in the combination/mixture do not evaporate. In still other examples, milling may be accomplished in a cooled milling machine (e.g., a cooled planetary mill). In these examples, milling may be accomplished continuously without any resting periods. In one of these examples, the milling conditions may include continuous milling for a time period ranging from about 10 minutes to about 40 minutes at about 700 rpm. It is to be understood that the milling conditions described herein are examples and that other milling conditions may be used.

Filtering may be accomplished in order to remove the grinding media. In some examples, the collected filtrate is the binder fluid, which is jettable via a thermal inkjet printhead. In other examples, the collected filtrate may be further diluted in order to obtain the binder fluid. Whether dilution is used depends, in part, on the filtering mechanism used, the filtrate that is collected, the concentration of the components in the filtrate, etc.

In some examples, the filtering may be accomplished with a stainless steel filter. As such, the mixture formed from the milling may be placed onto the stainless steel filter from the zirconia milling vessel(s). In some of these examples, the mixture alone is filtered to remove the grinding medium, and the collected filtrate is used as the binder agent without rinsing or dilution. In others of these examples, a blend of vehicle components and water may be used to rinse the mixture through the filter. In an example, the vehicle components included in the blend may be similar to the vehicle components included in the milling combination, and the water may be deionized water. In another example, the blend may include the vehicle components and water at a volume ratio of vehicle components to water ranging from 1:0.2 to 1:5. In yet another example, the blend may include the vehicle components and water at a volume ratio of vehicle components to water of 1:2. In still another example, about 50 mL of the blend may be used to rinse the mixture through the filter. In these examples, the binder agent is formed after the grinding media is removed and the filtrate is rinsed and diluted with the blend.

In other examples, the filtering may be accomplished with a filter built into the milling machine. In some of these examples, the mixture is transported through the built-in filter, which separates the grinding medium and forms the binder agent without additional rinsing or dilution. In others of these examples, the mixture is transported through the built-in filter, which separates the grinding medium. The filtered mixture may then be further diluted with the blend describe herein to form the binder fluid.

Binder Agents Including Nickel Nanoparticles

In some examples, the binder agent for a three-dimensional (3D) printing process, comprises: nickel nanoparticles; and a liquid vehicle including: an antioxidant; a symmetric triblock copolymer including poly(ethylene oxide) and poly(propylene oxide); and a balance of water. In some of these examples, the binder agent consists of the nickel nanoparticles and the liquid vehicle with no other components. In some other of these examples, the binder agent may include additional components.

Some examples of the binder agent include the nickel nanoparticles. In one of these examples, the binder agent may be used in a 3D printing process with iron build material particles, iron alloy build material particles (e.g., steel build material particles), nickel build material particles, or nickel alloy build material particles.

In some examples, the nickel nanoparticles have a particle size ranging from about 1 nm to about 100 nm. In one example, the nickel nanoparticles have a particle size of less than 100 nm. In another example, the nickel nanoparticles have a particle size of less than 50 nm. In still another example, the nickel nanoparticles have a particle size of less than 30 nm. In yet another example, the nickel nanoparticles have a particle size ranging from about 4 nm to about 15 nm. As mentioned above, the term "particle size", as used herein, may refer to a number-weighted mean diameter or a volume-weighted mean diameter of a particle distribution.

The nickel nanoparticles may be present in the binder agent in an amount that allows the binder agent to have binding efficiency. The nickel nanoparticles may also be present in the binder agent in an amount that allows the binder agent to be jettable via thermal or piezoelectric inkjet printing. In some examples, the nickel nanoparticles are present in the binder agent in an amount ranging from about 2 wt % active to about 60 wt % active, based on a total weight of the binder agent. In one example, the nickel nanoparticles are present in the binder agent in an amount of about 5 wt % active, based on the total weight of the binder agent. In another example, the nickel nanoparticles are present in the binder agent in an amount ranging from about 8 wt % active to about 30 wt % active, based on a total weight of the binder agent.

As mentioned above, the binder agent also includes the liquid vehicle, which, in this example, has the nickel nanoparticles dispersed therein.

When the binder agent includes the nickel nanoparticles, the liquid vehicle includes an antioxidant, a symmetric triblock copolymer including poly(ethylene oxide) and poly(propylene oxide), and a balance of water. In some of these examples, the liquid vehicle consists of the antioxidant, the symmetric triblock copolymer including poly(ethylene oxide) and poly(propylene oxide), and water with no other components. In others of these examples, the liquid vehicle may include additional components, such as co-solvent(s), surfactant(s), anti-kogation agent(s), antimicrobial agent(s), and/or chelating agent(s).

The binder agent may include the antioxidant to prevent the oxidation of the nickel nanoparticles. If the nickel nanoparticles are oxidized, they may be unable to sinter or melt at a temperature less than 400° C.

It is believed that any antioxidant may be used. In an example, the antioxidant may be any of the examples described above.

In some examples, the antioxidant may be present in the binder agent in an amount ranging from about 0.05 wt % active to about 40 wt % active, based on the total weight of the binder agent. In other examples, the antioxidant may be present in the binder agent in an amount ranging from about 2 wt % active to about 20 wt % active, based on the total weight of the binder agent. In still other examples, the antioxidant is present in the binder agent in an amount of about 1 wt % active, based on the weight of the binder agent. As mentioned above, the amount of the antioxidant present in the binder agent may depend, in part, on the antioxidant used and/or the interaction between the antioxidant and the other components of the binder agent.

It is to be understood that the antioxidant may be added to this example of the binder agent separately or as part of a nickel nanoparticle dispersion.

The binder agent may include the symmetric triblock copolymer including poly(ethylene oxide) (PEO) and poly(propylene oxide) (PPO) to reduce or prevent the settling of the nickel nanoparticles. If the nickel nanoparticles settle, the binder agent may become non-jettable.

In some instances, when the nickel nanoparticles settle, they may settle as a hard flocculant. In these instances, the settled nickel nanoparticles may be non-redispersible. In addition to reducing and/or preventing the settling of the nickel nanoparticles, the symmetric triblock copolymer including poly(ethylene oxide) and poly(propylene oxide) may reduce and/or prevent the formation of non-redispersible deposit(s) if/when the nickel nanoparticles settle. As such, the symmetric triblock copolymer including poly(ethylene oxide) and poly(propylene oxide) may improve the redispersibility of settled nickel nanoparticles.

In some examples, the symmetric triblock copolymer including poly(ethylene oxide) and poly(propylene oxide) may be PLURONIC® 123 (available from BASF Corp.).

In some examples, the symmetric triblock copolymer including poly(ethylene oxide) and poly(propylene oxide) may evaporate or thermally decompose at a temperature below the sintering temperature of the nickel nanoparticles (e.g., a temperature below 400° C. or a temperature below 250° C.). In one of these examples, the symmetric triblock copolymer including poly(ethylene oxide) and poly(propylene oxide) may evaporate or thermally decompose at a temperature below 250° C. In another one of these examples, the symmetric triblock copolymer including poly(ethylene oxide) and poly(propylene oxide) may evaporate or thermally decompose at a temperature below 175° C. If the symmetric triblock copolymer does not evaporate or thermally decompose at a temperature below the sintering temperature of the nickel nanoparticles, the nickel nanoparticles may be unable to sinter at the sintering temperature due to the presence of the symmetric triblock copolymer around the nickel nanoparticles.

In some examples, the symmetric triblock copolymer including poly(ethylene oxide) and poly(propylene oxide) may be present in the binder agent in an amount ranging from about 0.1 wt % to about 10 wt %, based on the total weight of the binder agent. In some other examples, the symmetric triblock copolymer including poly(ethylene oxide) and poly(propylene oxide) may be present in the binder agent in an amount ranging from about 5 wt % to about 35 wt %, based on the weight of the nickel nanoparticles. In one of these examples, the symmetric triblock copolymer including poly(ethylene oxide) and poly(propylene oxide) is present in the binder agent in an amount of about 29.4 wt %, based on the weight of the nickel nanoparticles.

In some examples, the binder agent including the nickel nanoparticles is devoid of polyethylene glycol hexadecyl ether. In other examples, the binder agent including the nickel nanoparticles is devoid of any co-solvent(s) having a boiling point greater than 250° C. In still other examples, the binder agent including the nickel nanoparticles is devoid of any co-solvent(s) having a boiling point greater than 175° C.

In some examples, the binder agent includes co-solvent(s), surfactant(s), anti-kogation agent(s), antimicrobial agent(s), chelating agent(s), or a combination thereof. Any of co-solvents, surfactants, anti-kogation agents, antimicrobial agents, or chelating agents described above may be used in the any of the amounts described above. As such, when the binder agent includes the nickel nanoparticles, the liquid vehicle may be similar to the liquid vehicle when the binder agent includes the copper nanoparticles.

As mentioned above, water may make up the balance of the liquid vehicle, and as such, the amount of water may vary depending upon the amounts of the other components that are included. As an example, deionized water may be used.

As also mentioned above, in some examples, the binder agent may be a jettable composition. As also mentioned above, in one of these examples, the binder agent may be jettable via a thermal inkjet printhead.

Methods of Making the Binder Agent Including Nickel Nanoparticles

Also disclosed herein is a method of making the binder agent that includes the nickel nanoparticles. In an example, the method comprises: milling a combination of a slurry, grinding media, the symmetric triblock copolymer, and vehicle components to form a mixture, the slurry including the nickel nanoparticles, the antioxidant, and water; and filtering the mixture to remove the grinding media and form the binder agent.

The nickel nanoparticles, the antioxidant, and the symmetric triblock copolymer including poly(ethylene oxide) and poly(propylene oxide) may each be as described above. In an example, the slurry may include the nickel nanoparticles in an amount of about 17 wt % active, the antioxidant in an amount of about 0.05 wt % active, and a balance of water. The vehicle components may include any of the components of the liquid vehicle described above.

In an example, the combination may include about 5 grams of the slurry, about 60 grams of the grinding media, about 0.25 grams of the symmetric triblock copolymer including poly(ethylene oxide) and poly(propylene oxide), and about 3 mL of the vehicle components.

In some examples, the milling may be accomplished in a planetary ball mill. As mentioned above, the grinding media may be zirconia beads having a diameter of about 200 μm, although other grinding media may be used. In one of these examples, the combination of the slurry, grinding media, symmetric triblock copolymer including poly(ethylene oxide) and poly(propylene oxide), and vehicle components may be placed into zirconia milling vessel(s), which may then be placed in the planetary ball mill and rotated. In an example, two zirconia milling vessels are used.

The milling conditions may depend, in part, on the size of the grinding media, the rotation speed of the milling machine, and the initial homogenization of the combination. In some examples, suitable milling conditions may include from 4 to 6 milling events, where each event takes place for about 6 minutes at about 700 rpm, with about 30 minutes of rest between the milling events. In one of these examples, the milling includes 4 milling events. These milling conditions may be used when milling is accomplished in a non-cooled milling machine (e.g., a non-cooled planetary mill). In these examples, the resting periods may allow the combination/mixture to cool so that the water and/or co-solvent(s) therein do not evaporate. In other examples when milling is accomplished in a non-cooled milling machine (e.g., a non-cooled planetary mill), the milling conditions may include milling for a time period ranging from about 10 minutes to about 40 minutes with suitable resting periods so the water and/or co-solvent(s) in the combination/mixture do not evaporate. In still other examples, milling may be accomplished in a cooled milling machine (e.g., a cooled planetary mill). In these examples, milling may be accomplished continuously without any resting periods. In one of these examples, the milling conditions may include continuous milling for a time period ranging from about 10 minutes to about 40 minutes at about 700 rpm. It is to be understood that the milling conditions described herein are examples and that other milling conditions may be used.

Filtering may be accomplished in order to remove the grinding media. In some examples, the collected filtrate is the binder fluid, which is jettable via a thermal inkjet printhead. In other examples, the collected filtrate may be further diluted in order to obtain the binder fluid. Whether dilution is used depends, in part, on the filtering mechanism used, the filtrate that is collected, the concentration of the components in the filtrate, etc.

In some examples, the filtering may be accomplished with a stainless steel filter. As such, the mixture formed from the milling may be placed onto the stainless steel filter from the zirconia milling vessel(s). In some of these examples, the mixture alone is filtered to remove the grinding medium, and the collected filtrate is used as the binder agent without rinsing or dilution. In others of these examples, a blend of vehicle components and water may be used to rinse the mixture through the filter. In an example, the vehicle components included in the blend may be similar to the vehicle components included in the milling combination, and the water may be deionized water. In another example, the blend may include the vehicle components and water at a volume ratio of vehicle components to water ranging from 1:0.2 to 1:5. In yet another example, the blend may include the vehicle components and water at a volume ratio of vehicle components to water of 1:2. In still another example, about 50 mL of the blend may be used to rinse the mixture through the filter. In these examples, the binder agent is formed after the grinding media is removed and the filtrate is rinsed and diluted with the blend.

In other examples, the filtering may be accomplished with a filter built into the milling machine. In some of these examples, the mixture is transported through the built-in filter, which separates the grinding medium and forms the binder agent without additional rinsing or dilution. In others of these examples, the mixture is transported through the built-in filter, which separates the grinding medium. The filtered mixture may then be further diluted with the blend describe herein to form the binder fluid.

Printing Methods and Methods of Use

In some examples, examples of the binder agents disclosed herein may be used in methods of three-dimensional (3D) printing. In some of these examples, the method comprises: based on a 3D object model, selectively applying the binder agent on at least a portion of a layer of metal build material particles, wherein the binder agent includes one of: copper nanoparticles and a liquid vehicle including: an antioxidant, polyethylene glycol hexadecyl ether, and a balance of water; or stainless steel nanoparticles and a liquid vehicle including: polyethylene glycol hexadecyl ether and a balance of water; or nickel nanoparticles and a liquid vehicle including: an antioxidant, a symmetric triblock copolymer including poly(ethylene oxide) and poly(propylene oxide), and a balance of water; and exposing the layer to a sintering temperature of the copper nanoparticles, the stainless steel nanoparticles, or the nickel nanoparticles to bind the metal build material particles in the at least the portion to form a bound layer.

In an example, the method for three-dimensional (3D) printing comprises: based on a 3D object model, selectively applying the binder agent (including the copper nanoparticles) on at least a portion of a layer of metal build material particles; and exposing the layer to a sintering temperature of the copper nanoparticles to bind the metal build material particles in the at least the portion to form a bound layer.

In another example, the method for three-dimensional (3D) printing comprises: based on a 3D object model, selectively applying the binder agent (including the stainless steel nanoparticles) on at least a portion of a layer of metal build material particles; and exposing the layer to a sintering temperature of the stainless steel nanoparticles to bind the metal build material particles in the at least the portion to form a bound layer.

In still another example, the method for three-dimensional (3D) printing comprises: based on a 3D object model, selectively applying the binder agent (including the nickel nanoparticles) on at least a portion of a layer of metal build material particles; and exposing the layer to a sintering temperature of the nickel nanoparticles to bind the metal build material particles in the at least the portion to form a bound layer.

Figure 1B:
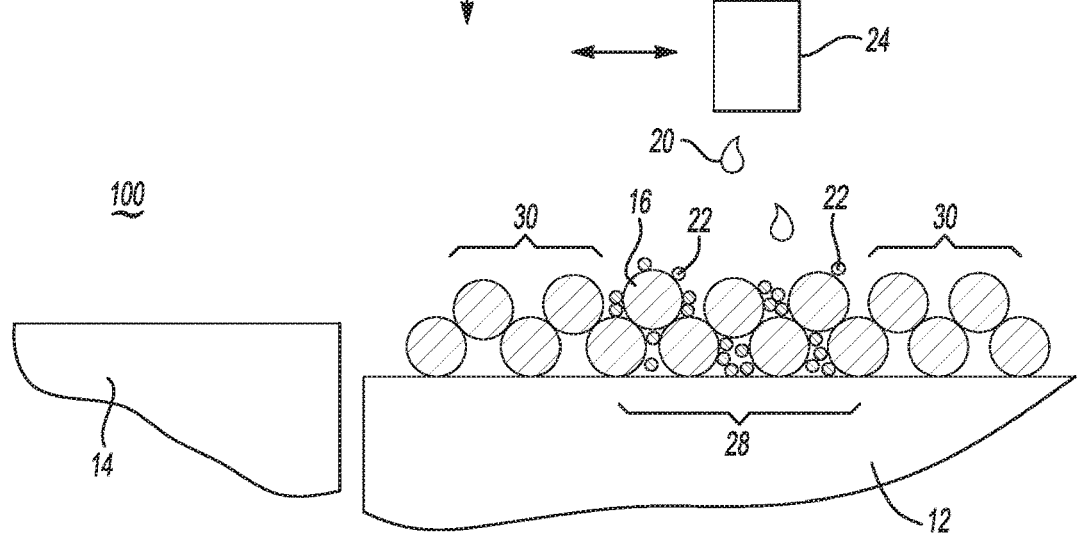
Figure 1C:
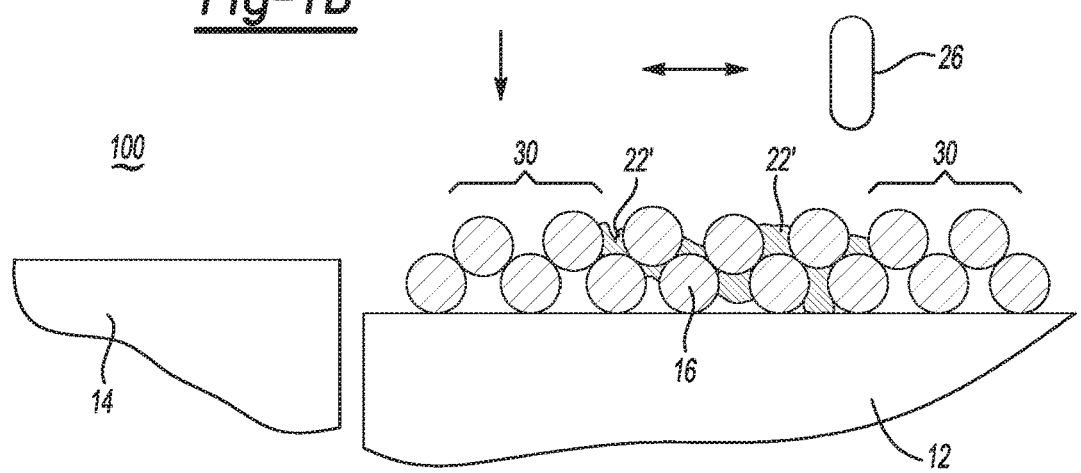

Examples of the 3D printing method 100, which include the binder agent 20 and the metal build material particles 16, are shown in FIGS. 1A-1C.

As depicted in FIGS. 1A-1B, a 3D printing system may include a build area platform 12, a supply 14 of a metal build material particles 16; a build material distributor 18, an inkjet applicator 24, and a heat source 26.

Figure 2:
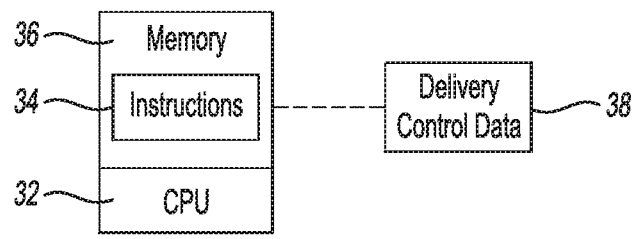
FIG. 2 is a block diagram illustrating a portion of a 3D printing system that can use an example of the binder agent disclosed herein.

Each of these physical elements of the 3D printing system may be operatively connected to a central processing unit 32 (see FIG. 2) of the 3D printing system. The central processing unit 32 (e.g., running computer readable instructions 34 stored on a non-transitory, tangible computer readable storage medium) manipulates and transforms data represented as physical (electronic) quantities within the printer's registers and memories 36 in order to control the physical elements to create the 3D part. The data for the selective delivery of the binder agent 20, the metal build material particles 16, etc. may be derived from a 3D model of the 3D part to be formed. For example, the instructions 34 may cause the controller to utilize an applicator (e.g., an inkjet applicator 24) to selectively dispense the binder agent 20, and to utilize a build material distributor 18 to dispense the metal build material particles 16. The central processing unit 32 controls the selective delivery (i.e., dispensing) of the binder agent 20 in accordance with delivery control data 38.

While one example of the printing system is depicted, it is to be understood that other printing systems may also be used.

The method 100 involves forming a layer of the metal build material particles 16. This is shown in FIGS. 1A and 1B.

The build area platform 12 receives the metal build material particles 16 from the build material supply 14. The build area platform 12 may be integrated with the printing system or may be a component that is separately insertable into the printing system. For example, the build area platform 12 may be a module that is available separately from the printing system. The build material platform 12 that is shown is also one example, and could be replaced with another support member, such as a platen, a fabrication/print bed, a glass plate, or another build surface.

The build area platform 12 may be moved so that metal build material particles 16 may be delivered to the platform 12 or to a previously formed bound layer (i.e., metal build material particles 16 held together by metal connections 22'). In an example, when the metal build material particles 16 are to be delivered, the build area platform 12 may be programmed to advance (e.g., downward) enough so that the build material distributor 18 can push the build material 16 onto the platform 12 to form a layer of the metal build material particles 16 thereon. The build area platform 12 may also be returned to its original position.

The build material supply 14 may be a container, bed, or other surface that is to position the metal build material particles 16 between the build material distributor 18 and the build area platform 12. In some examples, the build material supply 14 may include a surface upon which the build material 16 may be supplied, for instance, from a build material source (not shown) located above the build material supply 14. Examples of the build material source may include a hopper, an auger conveyer, or the like. Additionally, or alternatively, the build material supply 14 may include a mechanism (e.g., a delivery piston) to provide, e.g., move, the metal build material particles 16 from a storage location to a position to be spread onto the build area platform 12 or onto a previously formed layer.

The build material distributor 18 may be moved over the build material supply 14 and across the build area platform 12 to spread a layer of the metal build material 16 particles over the build area platform 12. The build material distributor 18 may also be returned to a position adjacent to the build material supply 14 following the spreading of the metal build material particles 16. The build material distributor 18 may be a blade (e.g., a doctor blade), a roller, a combination of a roller and a blade, and/or any other device capable of spreading the metal build material particles 16 over the build area platform 12. For instance, the build material distributor 18 may be a counter-rotating roller.

In an example, the thickness of the build material layer ranges from about 10 µm to about 70 µm, although thinner or thicker layers may also be used. For example, the thickness of the layer may range from about 20 µm to about 500 µm. Depending upon the desired thickness for the layer and the particle size(s) of the metal build material particles 16, the layer that is formed in a single build material application may be made up of a single row of the metal build material particles 16 or several rows of the metal build material particles 16.

The metal build material particles 16 may be any suitable metal or combinations of metals, that when combined with the metal connections 22' will form a target alloy system for the final 3D part. The target alloy system may have iron, steel, nickel, aluminum, titanium, copper, or a precious metal (e.g., silver, gold, platinum, or palladium) as the main component. The main component may be selected as all of the build material particles or as a percentage of the build material particles. For example, if the target alloy system is a copper alloy of 60-70% copper brass, the metal build material particles may include suitable percentages of copper and zinc.

When the same metal is used as the main component in the build material 16 and as the nanoparticles 22 in the binder agent 20, it is to be understood that the percentage of the metal in the build material composition may be adjusted to compensate for the amount of the metal that will be introduced in the form of the metal nanoparticles 22. As an example, to obtain a 3D part with the target alloy system of 60-70% copper brass, a 65% copper metal powder (also including zinc, and in some instances other alloying element(s), such as aluminum, manganese, silicon, phosphorus, arsenic, lead, tin, iron, and/or nickel, which can be present in a total amount of up to about 6%) may be used with a 1% to 5% loading of copper nanoparticles 22.

When different metals are used for the build material 16 and the nanoparticles 22 in the binder agent 20, a build material that is deficient in the metal of the nanoparticles 22 may be selected, and the nanoparticles 22 may be used to bring the content of that metal within the range of the target alloy. As an example, steel metal powder that includes no nickel may be used with a binder agent 20 containing nickel nanoparticles 22, and the loading may be sufficient to approach the specification for nickel within the target steel.

When the build material 16 includes the nanoparticle metal as a minor (not the main) component, then the binder agent 20 including the nanoparticles 22 may be added in an amount that is sufficient to stay within the specification for the metal within the target alloy. As an example, steel metal powder that includes about 14% nickel may be used with a binder agent 20 containing nickel nanoparticles 22, and the loading of the nickel nanoparticles 22 may be sufficient to stay within the specification for nickel (e.g., 14-18%) for the target steel.

The method 100 also involves selectively applying the binder agent 20 containing the metal nanoparticles 22 (e.g., the copper nanoparticles, the stainless steel nanoparticles, or the nickel nanoparticles) to at least a portion 28 of the layer. This is shown in FIG. 1B.

As shown in FIG. 1B, the printing system also includes an inkjet applicator 24 for selectively dispensing the binder agent 20. The inkjet applicator 24 may include nozzles, fluid slots, and/or fluidics for dispensing the binder agent 20. The inkjet applicator 24 may be a thermal inkjet printhead or print bar, a piezoelectric printhead or print bar, or a continuous inkjet printhead or print bar. While a single inkjet applicator 24 is shown in FIG. 1B, it is to be understood that multiple inkjet applicators 24 may be used.

The inkjet applicator 24 may be scanned adjacent to the build area platform 12 to deposit the binder agent 20 over a layer of the metal build material particles 16. The inkjet applicator 24 may thus be attached to a moving XY stage or a translational carriage (neither of which is shown) that moves the inkjet applicator 24 adjacent to the build area platform 12 in order to deposit the binder agent 20 in predetermined areas of a layer of the metal build material particles 16 that has been formed on the build area platform 12 in accordance with the method(s) disclosed herein.

The inkjet applicator 24 selectively applies the binder agent 20 on those portions 28 of the layer of the metal build material particles 16 that are to form the bound layer(s), and ultimately the final 3D part. The binder agent 20 may not be applied on the entire layer, as shown at the portions 30.

The binder agent 20 is selectively deposited at a loading that wets the portion 28 of the layer through its thickness without saturating the portion 28. Wetting the portion through the layer means that the binder agent 20 at least partially penetrates the voids between the build material particles 16 throughout the entire thickness, and may even slightly penetrate into an underlying bound layer. This helps adjacent layers to interconnect. However, the loading is such that the binder agent 20 does not saturate the layer. Saturation occurs when the build material particles 16 at the patterned portion 28 become thoroughly soaked with the binder agent 20 such that no more liquid can be absorbed.

The binder agent 20 used may depend, in part, upon the target alloy system for the 3D part being formed, as well as composition of the build material particles 16. Some examples of the target alloy systems (for the formed 3D part) and the main component of the build material particles 16 and the nanoparticles 22 that may be used to obtain these target alloy systems are shown in Table 1.

TABLE 1

| Target Alloy System | Main Component of Build Material | Nanoparticle Materials |
|---|---|---|
| Iron alloy | Iron | Stainless steel, copper, or nickel |
| Steel alloy | Iron | Stainless steel, copper, or nickel |
| Nickel alloy | Nickel | Stainless steel, copper, or nickel |
| Aluminum alloy | Aluminum | Copper |
| Titanium alloy | Titanium | Copper |
| Copper alloy | Copper | Copper |
| Precious metal alloy | Silver, Gold, Platinum or Palladium | Copper |

The method 100 also involves exposing the metal nanoparticles 22 to a sintering temperature of the metal nanoparticles 22.

As shown in FIG. 1C, the printing system may also include the heat source 26. The heat source 26 may be used to expose the build area platform 12 (and any metal build material particles 16 and/or binder agent 20 thereon) to heat that sinters the metal nanoparticles 22 to form metal connections 22'. The heat source 26 may be any suitable heat lamp, examples of which include commercially available infrared (IR) lamps, ultraviolet (UV) lamps, flash lamps, and halogen lamps. Other examples of the heat source 26 may include microwave radiation sources, xenon pulse lamps, IR lasers, etc.

The heat source 26 may be a stationary lamp (not shown) or a moving lamp 26. The stationary lamp may be in a fixed position relative to the build area platform 12, and may be turned on when heat exposure is desired and off when heat exposure is not desired. The moving lamp(s) 26 can be mounted on a track (e.g., translational carriage) to move across the build area platform 12. This allows for printing and heating in a single pass. Such lamps 26 can make multiple passes over the build area platform 12 depending on the amount of exposure utilized in the method(s) disclosed herein.

The heat source 26 may irradiate the entire build area platform 12 with a substantially uniform amount of energy. This can selectively sinter the metal nanoparticles 22 in the portions of the metal build material particles 16 patterned with the binder agent 20, while leaving the non-patterned portion(s) of the metal build material particles 16 below their melting or softening point (and thus not sintered).

The conditions for sintering are sufficient to sinter the nanoparticles 22, which form metal connections 22' that bind the metal build material particles 16 together to form the bound layer. This is shown in FIG. 1C.

The particle size of the metal nanoparticles 22 enable them to sinter at the sintering temperature while the metal build material particles 16 (e.g., having a particle size ranging from about 2 µm to about 200 µm) remain non-sintered. In an example, the sintering temperature of the metal nanoparticles 22 may be less than 400° C. In another example, the sintering temperature of the metal nanoparticles 22 may be less than 250° C. In still another example, the sintering temperature of the metal nanoparticles 22 may be at least 500° C. below the melting point of the metal build material particles 16. In these examples, the sintering of the metal nanoparticle 22 will occur and no appreciable sintering of the build material particles 16 will occur.

After the bound layer shown in FIG. 1C is formed, the method 100 may include repeating the applying of the metal build material particles 16, the selectively applying of the binder agent 20, and the exposing of the layer to the sintering temperature to form another bound layer and build up an intermediate part.

During the formation of the intermediate part, liquid components of the binder agent 20 may be evaporated.

After the intermediate part is formed, if desired, a high temperature sintering process can be performed to enhance adhesion between the build material particles 16 and to form the 3D part. The high temperature sintering process may also or alternatively be performed to consolidate some of the empty volume in the intermediate part. As such, some examples of the method 100 further include sintering the intermediate part at a temperature greater than 400° C. The temperature used may depend upon the melting temperature of the build material.

In some examples, prior to high temperature sintering, the intermediate part may be removed from the build area platform 12 and any non-bound build material particles 16 (e.g., from non-patterned portions 30) may be brushed off or otherwise removed. In other examples, high temperature sintering of the intermediate part may take place on the build area platform 12 without any unbound build material particles 16 being removed.

To further illustrate the present disclosure, examples are given herein. It is to be understood that these examples are provided for illustrative purposes and are not to be construed as limiting the scope of the present disclosure.

EXAMPLES

Example 1

A first example of the binder agent disclosed herein was prepared.

First, several dispersants were tested for effective use with copper nanoparticles. The dispersants that were tested were sodium dodecyl sulfate, BRIJ® S 100 (polyoxyethylene (100) stearyl ether available from Croda, Inc.), PLURONIC® 123 (a symmetric triblock copolymer including poly(ethylene oxide) and poly(propylene oxide) available from BASF Corp.), polyethylene glycol methyl ether, BRIJ® 72 (polyoxyethylene (2) stearyl ether available from Croda, Inc.), BRIJ® 76 (polyoxyethylene (10) stearyl ether available from Croda, Inc.), BRIJ® C2 (polyethylene glycol hexadecyl ether available from Croda, Inc., f.k.a. BRIJ® 52), BRIJ® 35 (poly(oxyethylene)(23) lauryl ether available from Croda, Inc.), DisperBYK® 2200 (high molecular weight copolymer with pigment affinic groups available from BYK), BYKJET® 9170 (solution of a structured copolymer with pigment-affinic groups available from BYK), DisperBYK® 163 (solution of a high molecular weight block copolymer with pigment affinic groups available from BYK), DisperBYK® 145 (phosphoric ester salt of a high molecular weight copolymer with pigment-affinic groups available from BYK), DisperBYK® 111 (copolymer with acidic groups available from BYK), DisperBYK® 110 (solution of a copolymer with acidic groups available from BYK), BYKJET® 9131 (solution of a structured copolymer with pigment-affinic groups available from BYK), DisperBYK® 2015 (solution of a structured acrylate copolymer with pigment-affinic groups available from BYK), BYKJET® 9151 (structured copolymer with pigment affinic groups available from BYK), DisperBYK® 190 (solution of a high molecular weight block copolymer with pigment affinic groups available from BYK), DisperBYK® 180 (alkylol ammonium salt of a copolymer with acidic groups available from BYK), SURFYNOL® 485 (liquid or low-melting wax that contains no added alkylphenol ethoxylates available from Evonik Industries), polyvinyl pyrrolidinone, polyvinyl alcohol, IGEPAL® CO-890 (branched polyoxyethylene (40) nonylphenyl ether available from Rhodia Operations), polyurethane diol, sodium dodecylbenzenesulfonate, dodecyl amine, benzyl sodium sulfate, docusate sodium salt, JONCRYL® 683 (low acid-value acrylic resin available from BASF Corp.), ethylenediaminetetraacetic acid, E-SPERSE® 100 (available from Ethox Chemicals), tetrabutylammonium bromide, and TRITON™ X-100 (4-(1,1,3,3-Tetramethylbutyl)phenyl-polyethylene glycol available from Sigma-Aldrich).

Each dispersant was mixed with copper nanoparticles (which included an antioxidant), and vehicle components (including water, 2-pyrrolidone, SURFYNOL® SEF, CAPSTONE® FS-35, CRODAFOS® O3A, CARBOSPERSE® K 7028, TRILON® M, PROXEL® GXL, and KORDEK® MLX) using a vertical homogenizer. Then, the mixtures were allowed to settle over the course of one day. The mixture including polyethylene glycol hexadecyl ether (BRIJ® C2, f.k.a, BRIJ® 52) as the dispersant had the least amount of settling. As such, polyethylene glycol hexadecyl ether was selected for use with the copper nanoparticles in the first example binder agent.

To prepare the first example binder agent, 5 grams of a slurry including about 53 wt % active of copper nanoparticles (with a particle size of less than 100 nm), 0.5 wt % active of an antioxidant, and a balance of water (based on the total weight of the slurry) were combined with 60 grams of zirconia beads (200 μm in diameter), 0.3 grams of polyethylene glycol hexadecyl ether, and 3 mL of vehicle components. The general formulation of the vehicle components is shown in Table 2, with the wt % active of each component that was used based on the total weight of the vehicle components.

TABLE 2

| Ingredient | Specific component | Vehicle components (wt %) |
|---|---|---|
| Co-solvent | 2-pyrrolidone | 20.00 |
| Surfactant | SURFYNOL ® SEF | 0.75 |
|  | CAPSTONE ® FS-35 | 0.05 |
| Anti-kogation agent | CRODAFOS ® O3A | 0.50 |
|  | CARBOSPERSE ® K 7028 | 0.01 |
| Chelating agent | TRILON ® M | 0.04 |
| Biocide | PROXEL ® GXL | 0.18 |
|  | KORDEK ® MLX | 0.14 |
| Water | Deionized water | balance |

The combination was placed into two zirconia milling vessels, which were then placed in a planetary ball mill. The combination was milled in four milling events, with 30 minutes of rest between each milling event. During each milling event, the zirconia milling vessels were rotated at 700 rpm for 6 minutes.

Then, the mixture formed by the milling was filtered to remove the zirconia beads and form the first example binder agent. The mixture was placed onto a stainless steel filter, and 50 mL of a blend of vehicle components (having the general formulation shown in Table 2) and deionized water was used to rinse the mixture through the filter. The volume ratio of the vehicle components to deionized water in the blend was 1:2.

The first example binder agent collected from the stainless steel filter included 22 wt % active of copper nanoparticles (based on the total weight of the first example binder agent), the antioxidant, polyethylene glycol hexadecyl ether, and water.

The first example binder agent was successfully jetted using a thermal inkjet test pen.

The conductivity of the dried first example binder agent was tested. The first example binder agent was dried on a glass slide with an inert environment glove-box. After being exposed to an elevated temperature for 5 minutes, the sheet resistance of the dried first example binder agent was measured. The dried first example binder agent had a sheet resistance of 250 kΩ/sq after 5 minutes at 275° C., and the dried first example binder agent had a sheet resistance of 1Ω/sq after 5 minutes at 380° C. These results indicate that the copper nanoparticles were sintered after 5 minutes at 380° C. As such, these results further indicate that the polyethylene glycol hexadecyl ether was evaporated or thermally decomposed after 5 minutes at 380° C.

Example 2

A second example of the binder agent disclosed herein was prepared.

First, several dispersants were tested for effective use with stainless steel nanoparticles. The dispersants that were tested were sodium dodecyl sulfate, BRIJ® S 100 (polyoxyethylene (100) stearyl ether available from Croda, Inc.), PLURONIC® 123 (a symmetric triblock copolymer including poly(ethylene oxide) and poly(propylene oxide) available from BASF Corp.), polyethylene glycol methyl ether, BRIJ® 72 (polyoxyethylene (2) stearyl ether available from Croda, Inc.), BRIJ® 76 (polyoxyethylene (10) stearyl ether available from Croda, Inc.), BRIJ® C2 (polyethylene glycol hexadecyl ether available from Croda, Inc.), BRIJ® 35 (poly(oxyethylene)(23) lauryl ether available from Croda, Inc.), DisperBYK® 2200 (high molecular weight copolymer with pigment affinic groups available from BYK), BYK-JET® 9170 (solution of a structured copolymer with pigment-affinic groups available from BYK), DisperBYK® 163 (solution of a high molecular weight block copolymer with pigment affinic groups available from BYK), DisperBYK® 145 (phosphoric ester salt of a high molecular weight copolymer with pigment-affinic groups available from BYK), DisperBYK® 111 (copolymer with acidic groups available from BYK), DisperBYK® 110 (solution of a copolymer with acidic groups available from BYK), BYKJET® 9131 (solution of a structured copolymer with pigment-affinic groups available from BYK), DisperBYK® 2015 (solution of a structured acrylate copolymer with pigment-affinic groups available from BYK), BYKJET® 9151 (structured copolymer with pigment affinic groups available from BYK), DisperBYK® 190 (solution of a high molecular weight block copolymer with pigment affinic groups available from BYK), DisperBYK® 180 (alkylol ammonium salt of a copolymer with acidic groups available from BYK), SURFYNOL® 485 (liquid or low-melting wax that contains no added alkylphenol ethoxylates available from Evonik Industries), polyvinyl pyrrolidinone, polyvinyl alcohol, IGEPAL® CO-890 (branched polyoxyethylene (40) nonylphenyl ether available from Rhodia Operations), polyurethane diol, sodium dodecylbenzenesulfonate, dodecyl amine, benzyl sodium sulfate, docusate sodium salt, JON- CRYL® 683 (low acid-value acrylic resin available from BASF Corp.), ethylenediaminetetraacetic acid, E-SPERSE® 100 (available from Ethox Chemicals), tetrabutylammonium bromide, and Triton™ X-100 (4-(1,1,3,3-Tetramethylbutyl)phenyl-polyethylene glycol available from Sigma-Aldrich).

Each dispersant was mixed with stainless steel nanoparticles and vehicle components (including water, 2-pyrrolidone, SURFYNOL® SEF, CAPSTONE® FS-35, CRODAFOS® O3A, CARBOSPERSE® K 7028, TRILON® M, PROXEL® GXL, and KORDEK® MLX) using a vertical homogenizer. Then, the mixtures were allowed to settle over the course of one day. The mixture including polyethylene glycol hexadecyl ether (BRIJ® C2, f.k.a., BRIJ® 52) as the dispersant had the least amount of settling. As such, polyethylene glycol hexadecyl ether was selected for use with the stainless steel nanoparticles in the second example binder agent.

To prepare the second example binder agent, 2 grams of a stainless steel nanopowder (316 L, with a particle size ranging from 40 nm to 60 nm) were combined with 60 grams of zirconia beads (200 µm in diameter), 0.3 grams of polyethylene glycol hexadecyl ether, 2.5 mL of vehicle components (having the general formulation shown in Table 2), and 2.5 mL of water.

The combination was placed into two zirconia milling vessels, which were then placed in a planetary ball mill. The combination was milled in six milling events, with 30 minutes of rest between each milling event. During each milling event, the zirconia milling vessels were rotated at 700 rpm for 6 minutes.

Then, the mixture formed by the milling was filtered to remove the zirconia beads and form the second example binder agent. The mixture was placed onto a stainless steel filter, and 50 mL of a blend of vehicle components (having the general formulation shown in Table 2) and deionized water was used to rinse the mixture through the filter. The volume ratio of the vehicle components to deionized water in the blend was 1:2.

The second example binder agent collected from the stainless steel filter included 12 wt % active of stainless steel nanoparticles (based on the total weight of the second example binder agent), polyethylene glycol hexadecyl ether, and water.

The second example binder agent was successfully jetted using a thermal inkjet test pen.

The conductivity of the dried second example binder agent was tested. The second example binder agent was dried on a glass slide with an inert environment glove-box. After being exposed to an elevated temperature for 5 minutes, the sheet resistance of the dried second example binder agent was measured. The dried second example binder agent had a sheet resistance of 1.2 MΩ/sq after 5 minutes at 275° C., and the dried second example binder agent had a sheet resistance of 240 kΩ/sq after 5 minutes at 380° C. These results indicate that the stainless steel nanoparticles were sintered after 5 minutes at 380° C. As such, these results further indicate that the polyethylene glycol hexadecyl ether was evaporated or thermally decomposed after 5 minutes at 380° C.

Example 3

A third binder agent was prepared.

First, several dispersants were tested for effective use with nickel nanoparticles. The dispersants that were tested were sodium dodecyl sulfate, BRIJ® S 100 (polyoxyethylene (100) stearyl ether available from Croda, Inc.), PLURONIC® 123 (a symmetric triblock copolymer including poly(ethylene oxide) and poly(propylene oxide) available from BASF Corp.), polyethylene glycol methyl ether, BRIJ® 72 (polyoxyethylene (2) stearyl ether available from Croda, Inc.), BRIJ® 76 (polyoxyethylene (10) stearyl ether available from Croda, Inc.), BRIJ® C2 (polyethylene glycol hexadecyl ether available from Croda, Inc.), BRIJ® 35 (poly(oxyethylene)(23) lauryl ether available from Croda, Inc.), DisperBYK® 2200 (high molecular weight copolymer with pigment affinic groups available from BYK), BYK-JET® 9170 (solution of a structured copolymer with pigment-affinic groups available from BYK), DisperBYK® 163 (solution of a high molecular weight block copolymer with pigment affinic groups available from BYK), DisperBYK® 145 (phosphoric ester salt of a high molecular weight copolymer with pigment-affinic groups available from BYK), DisperBYK® 111 (copolymer with acidic groups available from BYK), DisperBYK® 110 (solution of a copolymer with acidic groups available from BYK), BYKJET® 9131 (solution of a structured copolymer with pigment-affinic groups available from BYK), DisperBYK® 2015 (solution of a structured acrylate copolymer with pigment-affinic groups available from BYK), BYKJET® 9151 (structured copolymer with pigment affinic groups available from BYK), DisperBYK® 190 (solution of a high molecular weight block copolymer with pigment affinic groups available from BYK), DisperBYK® 180 (alkylol ammonium salt of a copolymer with acidic groups available from BYK), SURFYNOL® 485 (liquid or low-melting wax that contains no added alkylphenol ethoxylates available from Evonik Industries), polyvinyl pyrrolidinone, polyvinyl alcohol, IGEPAL® CO-890 (branched polyoxyethylene (40) nonylphenyl ether available from Rhodia Operations), polyurethane diol, sodium dodecylbenzenesulfonate, dodecyl amine, benzyl sodium sulfate, docusate sodium salt, JONCRYL® 683 (low acid-value acrylic resin available from BASF Corp.), ethylenediaminetetraacetic acid, E-SPERSE® 100 (available from Ethox Chemicals), tetrabutylammonium bromide, and Triton™ X-100 (4-(1,1,3,3-Tetramethylbutyl)phenyl-polyethylene glycol available from Sigma-Aldrich).

Each dispersant was mixed with nickel nanoparticles and vehicle components (including water, 2-pyrrolidone, SURFYNOL® SEF, CAPSTONE® FS-35, CRODAFOS® O3A, CARBOSPERSE® K 7028, TRILON® M, PROXEL® GXL, and KORDEK® MLX) using a vertical homogenizer. Then, the mixtures were allowed to settle over the course of one day. The mixture including a symmetric triblock copolymer including poly(ethylene oxide) and poly(propylene oxide) (PLURONIC® 123) as the dispersant had the least amount of settling. As such, the symmetric triblock copolymer including poly(ethylene oxide) and poly(propylene oxide) was selected for use with the nickel nanoparticles in the third binder agent.

To prepare the third binder agent, 5 grams of a slurry including 17 wt % of nickel nanoparticles (with a particle size of less than 100 nm) and a balance of water (based on the total weight of the slurry) were combined with 60 grams of zirconia beads (200 µm in diameter), 0.25 grams of the symmetric triblock copolymer including poly(ethylene oxide) and poly(propylene oxide), and 3 mL of vehicle components (having the general formulation shown in Table 2).

The combination was placed into two zirconia milling vessels, which were then placed in a planetary ball mill. The combination was milled in four milling events, with 30 minutes of rest between each milling event. During each milling event the zirconia milling vessels were rotated at 700 rpm for 6 minutes.

Then, the mixture formed by the milling was filtered to remove the zirconia beads and form the third binder agent. The mixture was placed onto a stainless steel filter, and 50 mL of a blend of vehicle components (having the general formulation shown in Table 2) and deionized water was used to rinse the mixture through the filter. The volume ratio of the vehicle components to deionized water in the blend was 1:2.

The third binder agent collected from the stainless steel filter included 5 wt % of nickel nanoparticles (based on the total weight of the third binder agent), the symmetric tri-block copolymer including poly(ethylene oxide) and poly(propylene oxide), and water.

The third binder agent was successfully jetted using a thermal inkjet test pen.

While the third binder agent did not include an antioxidant, the preparation of the third binder agent and the use of the third binder agent were done in an environment that that contained less than 50 parts per million (ppm) of oxygen and water. It is believed that an antioxidant should be included in the third binder agent (thus, forming an example of the binder agent disclosed herein) to enable successful use in an environment containing air or oxygen in amount greater than 50 ppm.

Example 4

Additionally, the first and second example binder agents were used to create several example intermediate parts.

For each example intermediate part created using the first example binder agent, the first example binder agent was mixed with a copper metal powder that had a particle size of 50 µm. The mixture of the first example binder agent and the copper metal powder was cast into a mold and slow heated at 100° C. to create a 4.5 mm by 6 mm by 32 mm bar. Each bar that was created was removed from the mold and further heated for 30 minutes. Different intermediate parts were heated at different temperatures including i) 200° C., ii) 300° C., iii) 380° C., iv) 400° C., v) 500° C., and vi) 600° C. Each example intermediate part that was created using the first example binder agent was created in an inert environment glove-box.

For each example intermediate part created using the second example binder agent, the second example binder agent was mixed with a stainless steel (316 L) metal powder that had a particle size of 50 µm. The mixture of the second example binder agent and the stainless steel metal powder was cast into a mold and slow heated at 100° C. to create a 4.5 mm by 6 mm by 32 mm bar. Each bar that was created was removed from the mold and further heated for 30 minutes. Different intermediate parts were heated at different temperatures including i) 200° C., ii) 300° C., iii) 350° C., iv) 380° C., v) 400° C., vi) 500° C., vii) 600° C., viii) 700° C., and ix) 800° C. Some of the example intermediate parts created using the second example binder agent were created in an inert environment glove-box. Others of the example intermediate parts created using the second example binder agent were created in a fume hood (in ambient air conditions).

Figure 3:
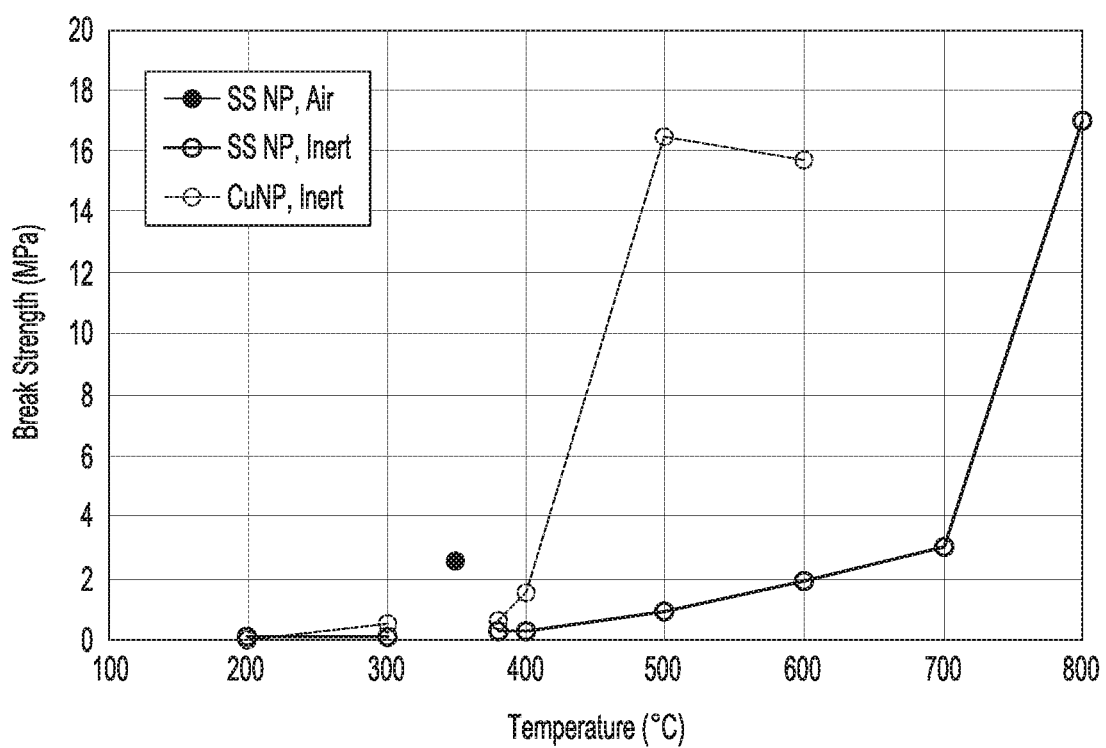
FIG. 3 is a graph showing break strength as a function of heating temperature for example intermediate parts, with the break strength (in MPa) shown on the y-axis, and the temperature (in ° C.) shown on the x-axis.

The break strength of each intermediate part was measured by performing a 3 point bend test using a strain sensor. The break strength of each intermediate part is shown in FIG. 3. In FIG. 3, the break strength (in MPa) is shown on the y-axis, and the temperature (in ° C.) at which the intermediate part was further heated is shown on the x-axis. The type of nanoparticles in the example binder agent used to create each intermediate part, and the type of environment in which each intermediate part was created is also identified in FIG. 3. These results indicate that the binder agents disclosed herein are suitable for use in the 3D printing methods disclosed herein.

It is to be understood that the ranges provided herein include the stated range and any value or sub-range within the stated range, as if such values or sub-ranges were explicitly recited. For example, from about 40 nm to about 60 nm should be interpreted to include not only the explicitly recited limits of from about 40 nm to about 60 nm, but also to include individual values, such as about 43.5 nm, about 47.67 nm, about 55.75 nm, about 58.0 nm, etc., and sub-ranges, such as from about 43.53 nm to about 50.5 nm, from about 46.25 nm to about 55.2 nm, from about 50.75 nm to about 58.79 nm, etc. Furthermore, when "about" is utilized to describe a value, this is meant to encompass minor variations (up to +/−10%) from the stated value.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. A binder agent for a three-dimensional (3D) printing process, comprising:
copper nanoparticles present in an amount of from about 2 wt % to about 27 wt % active, based on a total weight of the binder agent, the copper nanoparticles having a particle size ranging from about 1 nm to less than 100 nm; and
a liquid vehicle consisting of:
an antioxidant;
polyethylene glycol hexadecyl ether present in an amount ranging from about 0.1 wt % to about 10 wt %, based on the total weight of the binder agent; and
a balance of water,
wherein the binder agent is free of any additional component.

2. The binder agent as defined in claim 1 wherein the copper nanoparticles have a particle size ranging from about 4 nm to about 15 nm.

3. The binder agent as defined in claim 1 wherein the polyethylene glycol hexadecyl ether is present in an amount of from about 5 wt % to about 35 wt %, based on a weight percent of the copper nanoparticles.

4. The binder agent as defined in claim 1 wherein the copper nanoparticles melt at a temperature of less than 400° C.

5. The binder agent as defined in claim 1 wherein the antioxidant is present in an amount ranging from about 0.05 wt % to about 40 wt % active, based on the total weight of the binder agent.

6. A binder agent for a three-dimensional (3D) printing process, the binder agent consisting of:
  copper nanoparticles having a particle size ranging from about 1 nm to less than 100 nm; and
  a liquid vehicle consisting of:
    an antioxidant;
    polyethylene glycol hexadecyl ether; and
    a balance of water.

7. The binder agent as defined in claim 6 wherein the copper nanoparticles melt at a temperature of less than 400° C.

8. The binder agent as defined in claim 6 wherein the antioxidant is present in an amount ranging from about 0.05 wt % to about 40 wt % active, based on the total weight of the binder agent.

9. The binder agent as defined in claim 6 wherein the polyethylene glycol hexadecyl ether is present in an amount ranging from about 0.1 wt % to about 10 wt %, based on the total weight of the binder agent.

10. A method of making the binder agent defined in claim 1, the method comprising:
  milling a combination of a slurry, a grinding media, the polyethylene glycol hexadecyl ether, and vehicle components to form a mixture, the slurry including the copper nanoparticles, the antioxidant, and water; and
  filtering the mixture to remove the grinding media and form the binder agent.

11. A method for three-dimensional (3D) printing, comprising:
  based on a 3D object model, selectively applying the binder gent defined in claim 1 on at least a portion of a layer of metal build material particles; and
  exposing the layer to a sintering temperature of the copper nanoparticles to bind the metal build material particles in the at least the portion to form a bound layer.

* * * * *